(12) United States Patent
Tanaka

(10) Patent No.: US 7,329,015 B2
(45) Date of Patent: Feb. 12, 2008

(54) VARIABLE SHAPE MIRROR AND OPTICAL PICKUP DEVICE HAVING THE SAME

(75) Inventor: Fuminori Tanaka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/712,486

(22) Filed: Mar. 1, 2007

(65) Prior Publication Data

US 2007/0206300 A1    Sep. 6, 2007

(30) Foreign Application Priority Data

Mar. 2, 2006    (JP)    .............................. 2006-056327

(51) Int. Cl.
*G02B 7/182*    (2006.01)

(52) U.S. Cl. .................................................... 359/846

(58) Field of Classification Search ................ 359/224, 359/846, 849
See application file for complete search history.

(56) References Cited

U.S. PATENT DOCUMENTS 4,786,836 A * 11/1988 Tokushima ............ 310/323.07

FOREIGN PATENT DOCUMENTS

JP    A-2004-220702    8/2004
JP    A-2005-196859    7/2005

* cited by examiner

*Primary Examiner*—Euncha P. Cherry
(74) *Attorney, Agent, or Firm*—Morgan, Lewis & Bockius LLP

(57) ABSTRACT

The variable shape mirror (1) includes a substrate (2) and a bulk piezoelectric body (3). On the piezoelectric body (3), a specular surface (4) is formed, and further a plurality of grooves (5a-5e) are formed at a predetermined interval. The grooves (5a-5e) are arranged so as to surround the specular surface (4) and filled with the conductive members. The conductive members embedded in the grooves (5a-5e) are connected electrically to one of a pair of common electrodes (7a and 7b) that is disposed to cross the grooves (5a-5e) and are formed to be electrodes having different polarities in alternating manner in the direction from the inner side to the outer side of the grooves (5a-5e).

17 Claims, 4 Drawing Sheets

VARIABLE SHAPE MIRROR AND OPTICAL PICKUP DEVICE HAVING THE SAME

This application is based on Japanese Patent Application No. 2006-056327 filed on Mar. 2, 2006, the contents of which are hereby incorporated by reference.

BACKGROUND OF THE INVENTION

1. Field of the Invention

The present invention relates to a variable shape mirror that is provided to an optical device such as an optical pickup device. In particular, the present invention relates to a variable shape mirror that is formed by using a bulk material having piezoelectric characteristics. In addition, the present invention relates to an optical pickup device having a variable shape mirror.

2. Description of Related Art

Conventionally, there are many reports concerning a variable shape mirror that can alter a shape of its specular surface, and there are roughly two types of variable shape mirrors as follows.

A first type is a variable shape mirror that is formed by laminating thin films. This type of variable shape mirror having a structure in which thin films are laminated is, for example, formed by laminating thin films in an order of a substrate, a lower electrode, a piezoelectric body, an upper electrode, an insulator, and a reflection film. In addition, as described in JP-A-2005-196859, for example, there is another type of variable shape mirror in which thin films are laminated on a substrate in an order of a lower electrode, a piezoelectric body, an upper electrode, and an elastic body, and the side of the substrate opposite to the side on which the thin film are laminated is made a circular cavity portion on which a reflection film is formed. Furthermore, the variable shape mirror that is formed as described in JP-A-2005-196859 can obtain a large shape change at low voltage because thickness of a film at a movable part can be made thin.

A second type is a type of variable shape mirror that does not use a piezoelectric body made up of a thin film but utilizes expansion and contraction in the vertical direction of a piezoelectric element made up of a bulk material so as to alter a shape of its specular surface. This type of variable shape mirror is made up of a mirror member having a shape like a thin film including a specular surface, a mirror support substrate for supporting the mirror member, a plurality of piezoelectric elements disposed between the mirror member and the mirror support substrate, and electrodes disposed so that a voltage can be applied to each of the piezoelectric elements as described in JP-A-2004-220702, for example.

However, the first type of variable shape mirror that is a type formed by laminating thin films may not have sufficient performance that is required to a variable shape mirror because that the piezoelectric body is a thin film and that piezoelectric characteristic of the piezoelectric body is inferior to the case of a bulk piezoelectric body. In addition, lamination of thin films for manufacturing the variable shape mirror requires a sophisticated manufacturing technique, so there may be problems of high manufacturing cost of the variable shape mirror and a heavy load on manufacturing works.

Furthermore, in a case of the second type of variable shape mirror, the plurality of piezoelectric elements disposed between the mirror member and the mirror support substrate require fine adjustment in a machining process of them so that each size of them matches or require to be cut out in a very small size. Therefore, there is a problem of an increase of manufacturing cost or the like because a loss of material is generated in a cutting process.

SUMMARY OF THE INVENTION

In view of the above described problems it is an object of the present invention to provide a variable shape mirror that can obtain a large quantity of deformation and can be manufactured at low cost with a simple process. In addition, it is another object of the present invention to provide an optical pickup device equipped with such a variable shape mirror, which can correct wave aberration appropriately and can be manufactured at low cost.

To attain the above described first object a variable shape mirror in accordance with one aspect of the present invention includes: a specular surface; a piezoelectric body that alters a shape of the specular surface by expansion and contraction thereof when a voltage is applied; and a substrate for supporting the piezoelectric body. Also, the variable shape mirror is characterized by a structure in which the piezoelectric body is made of a bulk material, the specular surface is formed on the piezoelectric body, the substrate supports the piezoelectric body on the side opposite to the side on which the specular surface is formed, a plurality of grooves are formed at a predetermined interval on the surface of the piezoelectric body on which the specular surface is formed, the grooves being arranged so as to surround the specular surface and filled with the conductive members, and the conductive members embedded in the grooves are formed to be electrodes having different polarities in alternating manner in the direction from the inner side to the outer side of the plurality of grooves.

In addition, the present invention is characterized in that the respective plurality of formed grooves have analog shapes concerning a shape of surrounding the specular surface in the variable shape mirror having the structure described above.

In addition, the present invention is characterized in that the respective plurality of formed grooves are disposed in substantially concentric circles in the variable shape mirror having the structure described above.

In addition, the present invention is characterized in that the piezoelectric body and the substrate are made of the same material and are formed as a single unit in the variable shape mirror having the structure described above.

In addition, the present invention is characterized in that the respective plurality of formed grooves have the same number of conductive member lacking portions in which the conductive member is not filled, and that regions of the same number as the conductive member lacking portion that can control expansion and contraction of the piezoelectric body are formed on the piezoelectric body in the variable shape mirror having the structure described above.

In addition, the present invention is characterized in that each of the respective plurality of formed grooves have the same number of conductive member lacking portions in which the groove is interrupted so that the conductive member lacks, and that regions of the same number as the conductive member lacking portions that can control expansion and contraction of the piezoelectric body are formed on the piezoelectric body in the variable shape mirror having the structure described above.

In addition, the present invention is characterized to be an optical pickup device equipped with the variable shape mirror having the structure described above.

According to the first structure of the present invention, it is possible to obtain a variable shape mirror that has a good piezoelectric characteristic and can alter a shape of its specular surface because the piezoelectric body is made up of a bulk material. In addition, a step for cutting the piezoelectric body made up of a bulk material into small pieces and adjusting sizes of them is not necessary, and the piezoelectric body made up of a bulk material can be machined by a simple process so as to obtain the variable shape mirror. In addition, since the piezoelectric body made up of a bulk material is inexpensive and can be manufactured by a simple process, the variable shape mirror can be manufactured at low cost.

In addition, according to the second structure of the present invention, deformation of the specular surface can be performed efficiently in the variable shape mirror having the structure described above.

In addition, according to the third structure of the present invention, the specular surface can be performed more efficiently in the variable shape mirror having the first or the second structure described above.

In addition, according to the fourth structure of the present invention, the number of components can be reduced, and the variable shape mirror can be manufactured easily by a simple process in the variable shape mirror having any one of the first to the third structure described above.

In addition, according to the fifth or the sixth structure of the present invention, control of deforming the specular surface can be performed by a plurality of positions, and fine adjustment and complicated deformation can be performed concerning deformation of the specular surface in the variable shape mirror having any one of the first to the fourth structure described above.

In addition, according to the seventh structure of the present invention, as to the optical pickup device equipped with the variable shape mirror having any one of the first to the sixth structure, correction of wave aberration can be performed appropriately because the variable shape mirror can deform the specular surface largely. In addition, since the variable shape mirror can be formed simply at low cost, a variable shape mirror that is capable of correcting wave aberration appropriately can be manufactured at low cost.

BRIEF DESCRIPTION OF THE DRAWINGS

FIG. 1A is a perspective view thereof, FIG. 1B is a top view thereof, and FIG. 1C is a bottom view thereof.

DETAILED DESCRIPTION OF THE PREFERRED EMBODIMENTS

Now embodiments of the present invention will be described with reference to the attached drawings. At this point, the embodiments described here are merely examples and that the present invention should not be limited to these embodiments.

Figure 1A:
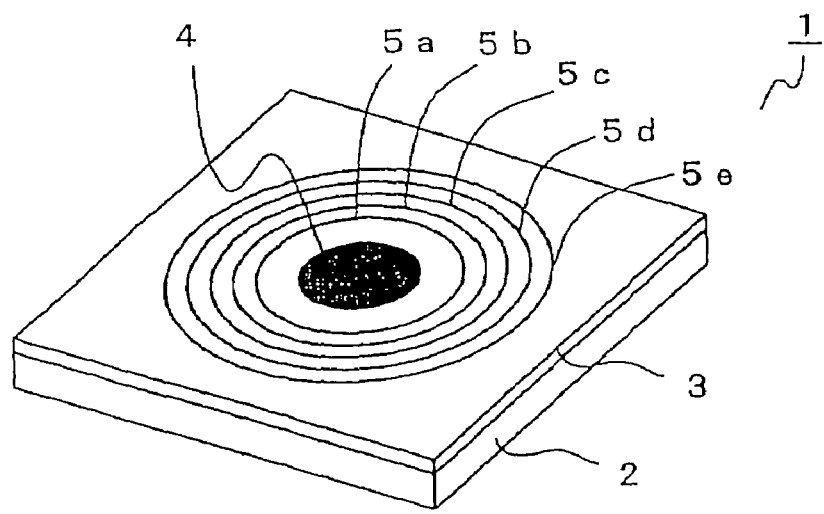
FIGS. 1A-1C are schematic diagrams to show a structure of a variable shape mirror according to a first embodiment.
Figure 1B:
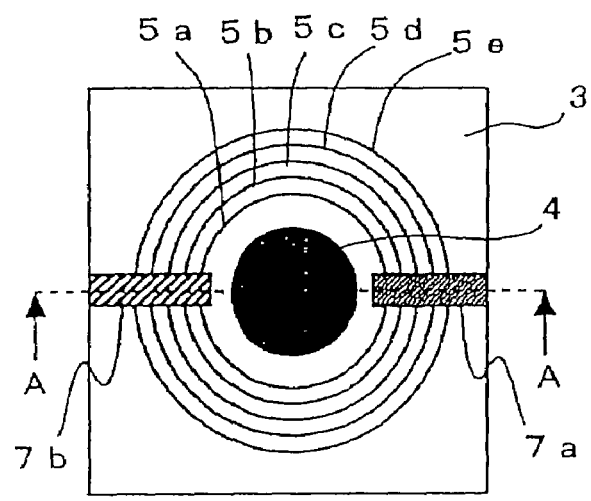
Figure 1C:
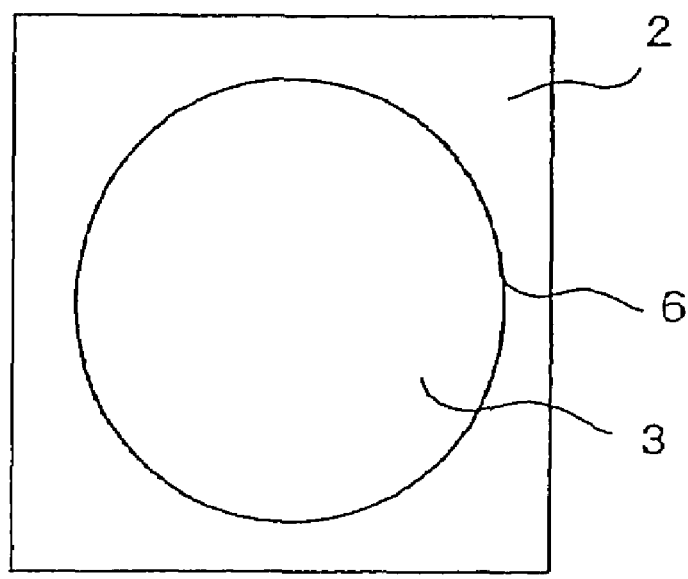

FIGS. 1A-1C are schematic diagrams to show a structure of a variable shape mirror according to a first embodiment. FIG. 1A is a perspective view to show a structure of a variable shape mirror 1 according to the first embodiment, FIG. 1B is a top view to show the structure of the variable shape mirror 1 according to the first embodiment, and FIG. 1C is a bottom view to show the structure of the variable shape mirror 1 according to the first embodiment. At this point, common electrodes 7a and 7b are shown in FIG. 1B but are omitted in FIG. 1A.

The variable shape mirror 1 is made up of a substrate 2 and a piezoelectric body 3 mainly. First, a piezoelectric body 3 will be described. The piezoelectric body 3 has a structure like a plate of a substantially square shape and is made of a bulk ceramic material. At this point, the shape of the piezoelectric body 3 should not be limited to the shape of the present embodiment but can be other plate-like shape of a circular shape, an elliptic shape or other polygonal shape.

The ceramic material that forms the piezoelectric body 3 should not be limited to a specific one as long as the material has a piezoelectric characteristic presenting expansion and contraction when a voltage is applied after polarization treatment. For example, PZT (lead zirconate titanate, $Pb(Zr_xTi1-x)O_3$) or a barium titanate ($BaTiO_3$) can be used. In the present embodiment, PZT is used for forming the variable shape mirror 1 considering its superiority in piezoelectric characteristic and other advantages.

At a middle portion of the top surface of the piezoelectric body 3 formed in a substantially square shape, a specular surface 4 having a substantially circular shape is formed. This specular surface 4 is obtained by forming a reflection film on the piezoelectric body 3 using a vapor deposition method or a sputtering method. A material that is used for the reflection film forming the specular surface 4 should not be limited to a specific one but can be aluminum (Al), gold (Au), silver (Ag) or the like, for example. In the present embodiment, aluminum is used because of its low cost and other advantages.

At this point, although the specular surface 4 has a substantially circular shape in the present embodiment, it may have other various shapes without limiting to the circular shape. In addition, although the specular surface 4 is obtained by forming the reflection film directly on the piezoelectric body 3 by vapor deposition or the like in the present embodiment, the present invention should not be interpreted to be limited to this structure. The structure can be modified within the spirit and the scope of the present invention without deviating from its object. For example, it is possible to dispose a member made of silicon (Si), glass or the like that can obtain smoothness on the piezoelectric body 3 and to form a reflection film on the member that can obtain smoothness by vapor deposition or the like so that the specular surface 4 is obtained. This structure is effective if the surface of the piezoelectric body 3 that forms the specular surface 4 is difficult to be smooth.

On the surface of the piezoelectric body 3 on which the specular surface 4 is formed (corresponding to the upper surface in FIGS. 1A and 1B), a plurality of grooves 5a-5e are formed in a substantially concentric manner (having substantially the same center as the center of the specular surface 4) at a predetermined interval surrounding the specular surface 4 that is formed in substantially a circular shape. A conductive member made of a metal or the like is embedded in the grooves 5a-5e, and the conductive member constitutes an electrode for applying a voltage to the piezoelectric body 3. This will be described later.

The substrate 2 play a role of supporting the piezoelectric body 3 from the surface the piezoelectric body 3 formed like a plate that is opposite to the surface on which the specular surface 4 is formed. In addition, as shown in FIG. 1C, the substrate 2 is provided with a substantially circular hollow portion 6, and a part of the piezoelectric body 3 on which the specular surface 4 is formed becomes movable so that the specular surface 4 can be deformed because of presence of the hollow portion 6.

At this point, although a substantially circular hollow portion 6 is provided to the substrate 2 in the present embodiment, this structure should not be interpreted in a limiting manner but can be modified variously. For example, it is possible to adopt a structure in which the shape of the hollow portion 6 is changed to a polygonal shape or an elliptic shape. In addition, it is possible to dispose the substrate 2 at four corners of the piezoelectric body 3 without the hollow portion 6. However, in order that the specular surface 4 can be deformed as described above, the substrate 2 for supporting the piezoelectric body 3 should not be disposed at least at the position that is opposed to the position on which the specular surface 4 is formed.

In addition, the material that forms the substrate 2 should not be limited to a specific one, and glass, silicon or the like can be used, for example. In this case, the substrate 2 and the piezoelectric body 3 are bonded by using adhesive or the like, for example. At this point, it is possible to make the substrate 2 using the same material as the piezoelectric body 3 and to for the substrate 2 and the piezoelectric body 3 as a single unit in the present embodiment.

Figure 2:
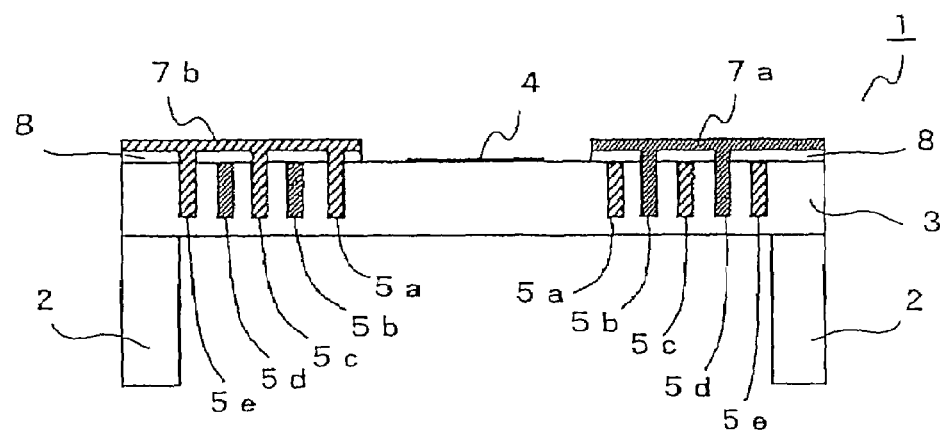
FIG. 2 is a schematic cross sectional view to show a structure of the variable shape mirror according to the first embodiment.

FIG. 2 is a schematic cross sectional view to show a structure of the variable shape mirror 1 when cut along the line A-A in FIG. 1B. With reference to FIG. 1B and FIG. 2, a structure of a conductive member embedded in grooves 5a-5e to work as an electrode will be described. The conductive member embedded in the grooves 5a-5e as it is does not work as an electrode, so it is necessary to form wiring so that a voltage can be applied to it. For this reason, a common electrode 7a and a common electrode 7b are provided so that the conductive member embedded in the grooves 5a-5b can work as an electrode in the present embodiment.

The common electrode 7a and the common electrode 7b are disposed at positions that are opposed to each other on the piezoelectric body 3 so that each of them crosses the grooves 5a-5e. Furthermore, a resin layer 8 made of polyimide or the like, for example, is disposed between the common electrodes 7a and 7b and the piezoelectric body 3. This resin layer 8 is provided for the purpose of preventing the common electrodes 7a and 7b from contacting with all the conductive members embedded in the grooves 5a-5e and preventing all the conductive members embedded in the grooves 5a-5e from being the same potential, so that different potentials can be applied to the common electrode 7a and the common electrode 7b.

Furthermore, the common electrode 7a is connected electrically to the conductive members embedded in the grooves 5b and 5d, and the common electrode 7b is connected electrically to the conductive members embedded in the grooves 5a, 5c, and 5e. Therefore, if a voltage is applied so that the common electrode 7a becomes a positive pole while the common electrode 7b becomes a negative pole, the conductive members embedded in the grooves 5b and 5d become positive poles while conductive members embedded in the grooves 5a, 5c, and 5e become negative poles so that the positive poles and the negative poles are arranged alternately. Therefore, it is possible to apply voltages to a part between the groove 5a and the groove 5b, a part between the groove 5b and the groove 5c, a part between the groove 5c and the groove 5d, and a part between the groove 5d and the groove 5e in the piezoelectric body 3, so that the piezoelectric body 3 can be expanded and contracted at these parts sandwiched between the grooves.

At this point, the arrangement of the common electrodes 7a and 7b should not be limited to the arrangement of the present embodiment but can be modified within the scope of the present invention without deviating from its purpose. For example, it is possible to arrange the common electrodes 7a and 7b side by side instead of arranging them at positions that are opposed to each other. Alternatively, it is possible to arrange the common electrodes 7a and 7b on the outer circumferential side on the piezoelectric body 3 where the grooves 5a-5e are not provided, for example. In other words, the structure is not limited as long as potentials can be applied so that polarities of the conductive members to be electrodes embedded in the grooves 5a-5e become alternately different polarities in the direction from inner side to the outer side of the grooves 5a-5e.

Figure 3:
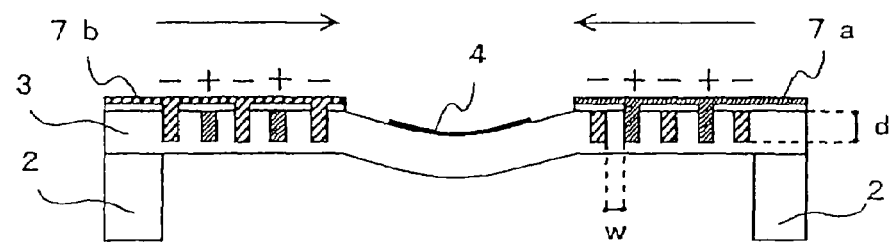
FIG. 3 is an explanatory diagram for describing an operation of the variable shape mirror according to the first embodiment.

FIG. 3 shows a situation in which the variable shape mirror 1 of the present embodiment alters its shape in comparison with FIG. 2. As shown in FIG. 3, when a voltage is applied so that the common electrode 7a and the common electrode 7b become the positive pole and the negative pole respectively, the part to which the voltage is applied is deformed so as to be expanded toward the center of the specular surface 4 (in the direction shown in FIG. 3 by arrows), and the part of the piezoelectric body 3 on which the specular surface 4 is formed is deformed so as to be convex downward. In other words, the specular surface 4 becomes a concave surface.

At this point, although the common electrode 7a is set to a positive pole while the common electrode 7b is set to a negative pole so that the part to which the voltage is applied is expanded toward the center of the specular surface 4 in the present embodiment, it is possible to adopt another structure in which the common electrode 7a is set to a negative pole while the common electrode 7b is set to a positive pole so that the part to which the voltage is applied is expanded toward the center of the specular surface 4. In addition, although the part to which the voltage is applied is expanded so that the part on which the specular surface 4 is formed becomes convex downward in the present embodiment, it is possible to adopt other structure in which the part on which the specular surface 4 is formed becomes convex upward by providing a notch to the movable part.

Furthermore, as to the variable shape mirror 1 having the structure described above, the number of the grooves 5a-5e, an interval (w) of the grooves 5a-5e, a depth (d) of the grooves 5a-5e, thickness of the piezoelectric body 3, or the like can be modified variously in accordance with a design specification depending on characteristics or the like that are required to the variable shape mirror 1. In particular, the interval of the grooves is associated with an application voltage when the piezoelectric body is driven, and the depth of the grooves is associated with a generated force when the voltage is applied. In addition, although the present embodiment has a structure in which a shape of the grooves 5a-5e enclosing the specular surface 4 is a circular shape, other structure may be adopted in which the shape becomes a polygonal shape, an elliptic shape or the like, for example.

Next, a method for manufacturing the variable shape mirror 1 having the structure described above will be described. First, the piezoelectric body 3 is cut out in a desired size and shape (a first step). On this occasion, the piezoelectric body 3 is abraded if necessary for a purpose of adjusting thickness of the piezoelectric body 3 or obtaining smoothness thereof. The obtained piezoelectric body 3 is machined so that substantially concentric circular grooves 5a-5e are formed at a predetermined interval between the grooves (a second step). At this point, it is possible to adopt a structure in which the grooves 5a-5e is obtained by burning after forming the grooves in advance by using a mold instead of the machining process.

A layer of metal (a conductive member) is formed in the grooves 5a-5e by the vapor deposition, the sputtering or the like, and the grooves 5a-5e are filled with the metal by electroplating (a third step). A mask is put on the grooves 5a-5e if necessary, and an insulation layer 8 made of polyimide or the like for example is formed by vapor deposition or the like (a fourth step). After that, the common electrodes 7a and 7b are formed by vapor deposition, sputtering or the like (a fifth step). A predetermined DC high voltage is applied (while heating if necessary) so as to perform the polarization treatment with respect to the piezoelectric body 3 (the sixth step).

The piezoelectric body 3 is bonded to the substrate 2, and the hollow portion 6 of the substrate 2 is formed by etching or the like (a seventh step). The hollow portion 6 may be formed by machining step without limiting to the etching or the like. Finally, the specular surface 4 is formed by vapor deposition, sputtering or the like (an eighth step). At this point, the formation method of the variable shape mirror 1 should not be limited to the method described above but can be modified variously.

In a case of the variable shape mirror 1 of the first embodiment described above, control of the voltage to be applied to the piezoelectric body 3 for deforming the specular surface 4 is performed only by control of the voltage to be applied to a pair of common electrodes 7a and 7b. Therefore it is difficult to perform a complicated control so that the fine adjustment is performed or the like when the specular surface 4 is deformed. A variable shape mirror according to a second embodiment that is structured considering the above-mentioned point will be described as follows. At this point, parts overlapping with the variable shape mirror 1 of the first embodiment are denoted by the same reference numerals, and description thereof will be omitted except the case where the description is necessary in particular.

Figure 4:
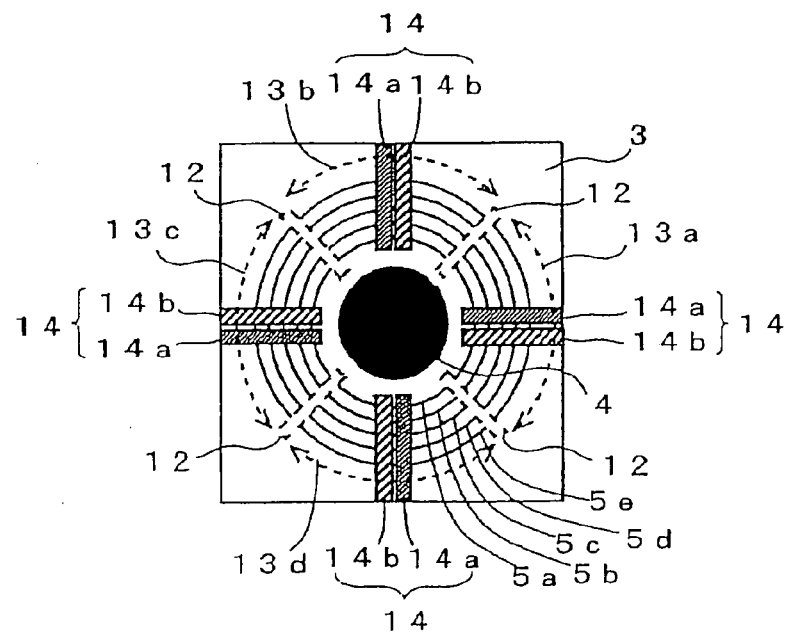
FIG. 4 is a schematic plan view to show a structure of a variable shape mirror according to a second embodiment.

FIG. 4 is a schematic plan view of the variable shape mirror 11 according to the second embodiment when viewed from the top. The variable shape mirror 11 of the second embodiment is also made up of a piezoelectric body 3 and a substrate 2 (see FIG. 1) in the same manner as the case of the first embodiment. At a middle portion of the top surface of the piezoelectric body 3, a specular surface 4 having a substantially circular shape is formed, and a plurality of grooves 5a-5e having substantially concentric circular shapes are formed so as to surround the specular surface 4 so that a conductive member such as a metal is embedded in the grooves 5a-5e. However, each of the grooves 5a-5e has conductive member lacking portions 12 at four positions in which the conductive member is not embedded so that the conductive member lacks.

The variable shape mirror 11 is provided with four pairs of common electrodes 14, and one of the pair becomes a positive pole while the other becomes a negative pole. Each of the common electrodes 14 is formed in a rectangular shape, and the common electrodes 14a and 14b are disposed at neighboring positions. In addition, the pair of common electrodes 14a and 14b are arranged so as to cross the same region among four regions 13a-13d (as shown in FIG. 4 by arrows) sandwiched between two conductive member lacking portions 12 of the grooves 5a-5e. In addition, the four pairs of common electrodes 14 cross different regions.

Although it is not shown in the drawings, an insulation layer is disposed between the common electrode 14 and the piezoelectric body 3 in the same manner as the case of the first embodiment, and the insulation layer controls electrical connection between each of the conductive members embedded in the grooves 5a-5e and the common electrode 14. In the present embodiment, the conductive members embedded in the grooves 5b and 5d are connected electrically to the common electrode 14a that becomes a positive pole while the conductive members embedded in the grooves 5a, 5c, and 5d are connected electrically to the common electrode 14b that becomes a negative pole.

The four pairs of common electrodes 14 are formed so that a voltage can be applied independently of each other, and it is possible to control deformation of the specular surface 4 from four regions finely by controlling voltages to be applied to each of the pair of common electrodes 14 individually. At this point, although the present embodiment adopts a structure in which a part of the grooves 5a-5d is not filled with the conductive member when the conductive member lacking portions 12 is formed, the present invention should not be limited to this structure. For example, it is possible to adopt other structure in which each of the grooves 5a-5e is formed intermittently so as to form the conductive member lacking portion 12.

In addition, the structure of the variable shape mirror 11 of the second embodiment should not be limited the structure described above but can be modified variously in the same manner as the case of the first embodiment. Furthermore, although the present embodiment adopts a structure in which the position for controlling deformation of the piezoelectric body 3 is disposed in four regions so as to control deformation of the specular surface 4, the present invention is not limited to this structure. It is possible to adopt a structure in which not four of but a plurality of regions are disposed so as to control deformation of the specular surface.

Next, an optical pickup device equipped with the variable shape mirror of the present invention will be described. An optical pickup device 20 that is capable of reading information from a plurality of types of optical recording media or writing information on the optical recording media may cause a problem of generating spherical aberration because a protective layer for protecting a recording surface of the optical recording medium has different thicknesses in accordance with types of the optical recording media. In addition, if the optical axis of the optical pickup device is inclined with respect to the optical recording medium, coma aberration is generated, which may cause a problem, too. The optical pickup device described here is an optical pickup device that can correct wave aberration such as spherical aberration and coma aberration.

Figure 5:
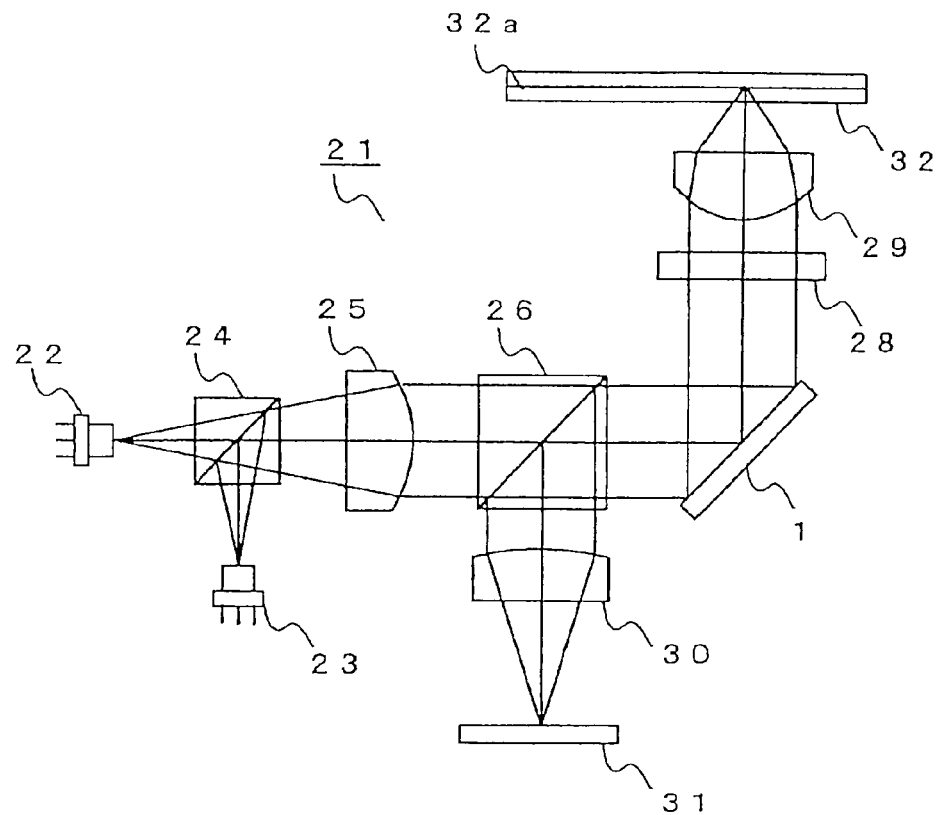
FIG. 5 is a schematic diagram to show a structure of an optical system of an optical pickup device equipped with the variable shape mirror according to the present invention.

FIG. 5 is a diagram to show an embodiment of an optical pickup device 21 equipped with the variable shape mirror of the present invention, and it is a schematic diagram to show an optical system of the optical pickup device. The optical system of the optical pickup device 21 includes a first light source 22, a second light source 23, a dichroic prism 24, a collimator lens 25, a beam splitter 26, a variable shape mirror 1, a quarter wave length plate 28, an objective lens 29, a condenser lens 30, and a photo detector 31.

The first and the second light sources 22 and 23 are semiconductor lasers, each of which emits a light beam having a wavelength corresponding to a type of the optical recording medium 32 on which information is recorded or reproduced by using the optical pickup device 21. At this point, each of the light sources 22 and 23 may be a two-wavelength integrated semiconductor laser or the like. In addition, the number of the light sources may be changed in accordance with types of the optical recording media on which information is recorded or reproduced by using the optical pickup device 21.

The light beams emitted from the first light source 22 and the second light source 23 are made to have the same optical axis by the dichroic prism 24, are converted into parallel rays by the collimator lens 25, pass the beam splitter 26, and are reflected by the variable shape mirror 1 so that the optical axis thereof becomes substantially perpendicular to the optical recording medium 32. The light beam reflected by the variable shape mirror 1 is made to have circular polarization by the quarter wave length plate 28 and is condensed onto the recording surface 32a of the optical recording medium 32 by the objective lens 29.

Reflection light reflected by the recording surface 32a passes through the objective lens 29, is made to have linear polarization that is shifted by 90 degrees from the outward light by the quarter wave length plate 28, is reflected by the variable shape mirror 1, then further reflected by the beam splitter 26, and is received by a light receiving portion (not shown) of the photo detector 31 via the condenser lens 30. The photo detector 31 converts light information included in the received reflection light into an electric signal.

In the optical pickup device 21 having the structure described above, the variable shape mirror 1 has not only the role of a so-called upstand mirror for changing the optical axis of the light beam but also a role of correcting wave aberration by applying a voltage to the piezoelectric body 3 so as to be expanded and contracted so that the specular surface 4 is deformed for adjusting a distribution of refractive index in a cross section perpendicular to the optical axis of the light beam that is reflected by the specular surface 4.

At this point, the structure of the optical system of the optical pickup device described above is merely an example, and it can be modified variously in accordance with its purpose. In addition, the variable shape mirror of the present invention can be applied not only to the optical pickup device but also to other optical devices having an optical system including a variable shape optical element, for example to a video projector, a digital camera, and the like.

The variable shape mirror of the present invention is superior in piezoelectric characteristics because it is made of a bulk material. In addition, it can be manufactured by a simple process and further at low cost. Therefore, it can be applied to various optical devices having an optical system that includes a variable shape optical element, so that each optical device can be improved in its characteristics and can be provided at low cost.

What is claimed is:

1. A variable shape mirror comprising:
a specular surface;
a piezoelectric body that alters a shape of the specular surface by expansion and contraction thereof when a voltage is applied; and
a substrate for supporting the piezoelectric body, wherein the piezoelectric body is made of a bulk material, the specular surface is formed on the piezoelectric body, the substrate supports the piezoelectric body on the side opposite to the side on which the specular surface is formed,
a plurality of grooves are formed at a predetermined interval on the surface of the piezoelectric body on which the specular surface is formed, the grooves being arranged so as to surround the specular surface and filled with the conductive members, and
the conductive members embedded in the grooves are formed to be electrodes having different polarities in alternating manner in the direction from the inner side to the outer side of the plurality of grooves.

2. The variable shape mirror according to claim 1, wherein the respective plurality of formed grooves have analog shapes concerning a shape of surrounding the specular surface.

3. The variable shape mirror according to claim 1, wherein the respective plurality of formed grooves are disposed in substantially concentric circles.

4. The variable shape mirror according to claim 2, wherein the respective plurality of formed grooves are disposed in substantially concentric circles.

5. The variable shape mirror according to claim 1, wherein the piezoelectric body and the substrate are made of the same material and are formed as a single unit.

6. The variable shape mirror according to claim 2, wherein the piezoelectric body and the substrate are made of the same material and are formed as a single unit.

7. The variable shape mirror according to claim 3, wherein the piezoelectric body and the substrate are made of the same material and are formed as a single unit.

8. The variable shape mirror according to claim 1, wherein the respective plurality of formed grooves have the same number of conductive member lacking portions in which the conductive member is not filled, and regions of the same number as the conductive member lacking portion that can control expansion and contraction of the piezoelectric body are formed on the piezoelectric body.

9. The variable shape mirror according to claim 2, wherein the respective plurality of formed grooves have the same number of conductive member lacking portions in which the conductive member is not filled, and regions of the same number as the conductive member lacking portion that can control expansion and contraction of the piezoelectric body are formed on the piezoelectric body.

10. The variable shape mirror according to claim 3, wherein the respective plurality of formed grooves have the same number of conductive member lacking portions in which the conductive member is not filled, and regions of the same number as the conductive member lacking portion that can control expansion and contraction of the piezoelectric body are formed on the piezoelectric body.

11. The variable shape mirror according to claim 4, wherein the respective plurality of formed grooves have the same number of conductive member lacking portions in which the conductive member is not filled, and regions of the same number as the conductive member lacking portion that can control expansion and contraction of the piezoelectric body are formed on the piezoelectric body.

12. The variable shape mirror according to claim 1, wherein the respective plurality of formed grooves have the same number of conductive member lacking portions in which the groove is interrupted so that the conductive member lacks, and regions of the same number as the conductive member lacking portions that can control expansion and contraction of the piezoelectric body are formed on the piezoelectric body.

13. The variable shape mirror according to claim 2, wherein the respective plurality of formed grooves have the same number of conductive member lacking portions in which the groove is interrupted so that the conductive member lacks, and regions of the same number as the conductive member lacking portions that can control expansion and contraction of the piezoelectric body are formed on the piezoelectric body.

14. The variable shape mirror according to claim 3, wherein the respective portions in which the groove is interrupted so that the conductive member lacks, and regions of the same number as the conductive member lacking portions that can control expansion and contraction of the piezoelectric body are formed on the piezoelectric body.

15. The variable shape mirror according to claim 4, wherein the respective plurality of formed grooves have the same number of conductive member lacking portions in which the groove is interrupted so that the conductive member lacks, and regions of the same number as the conductive member lacking portions that can control expansion and contraction of the piezoelectric body are formed on the piezoelectric body.

16. An optical pickup device equipped with the variable shape mirror according to claim 1.

17. An optical pickup device equipped with the variable shape mirror according to claim 2.

* * * * *